United States Patent [19]

Kurz et al.

[11] 3,969,328

[45] July 13, 1976

[54] COPOLYMERS OF VINYL CHLORIDE AND 2-HYDROXYPROPYL-ALKYL MALEATE

[75] Inventors: Dieter Kurz; Alex Sabel, both of Burghausen, Germany

[73] Assignee: Wacker Chemie GmbH, Munich, Germany

[22] Filed: Mar. 29, 1974

[21] Appl. No.: 456,131

[30] Foreign Application Priority Data

Apr. 4, 1973 Germany............................ 2316919

[52] U.S. Cl................................ 526/320; 260/33.6 R; 260/37 R; 526/345
[51] Int. Cl.².................... C08F 2/24; C08F 214/06
[58] Field of Search................ 260/78.5 CL, 78.5 B, 260/33.6 R, 37 R

[56] References Cited
UNITED STATES PATENTS

| | | | |
|---|---|---|---|
| 2,689,242 | 9/1954 | Lucht................................ | 260/92.8 |
| 3,260,704 | 7/1966 | Slocombe.......................... | 260/78.5 |
| 3,392,137 | 7/1968 | Slocombe.......................... | 260/33.6 |
| 3,635,914 | 1/1972 | Daniels et al................ | 260/78.5 CL |

*Primary Examiner*—John Kight, III
*Attorney, Agent, or Firm*—Hammond & Littell

[57] ABSTRACT

Copolymers of vinyl chloride and 2-hydroxypropyl-alkyl maleate and/or fumarate consisting of a copolymer with from 65% to 95% by weight of vinyl chloride monomer units and from 5% to 35% by weight of 2-hydroxypropyl-alkyl maleate and/or fumarate monomer units, where alkyl has from 8 to 18 carbon atoms and is preferably branched, optionally with up to 15% of a dialkyl maleate and/or fumarate monomer units, where each alkyl has from 8 to 18 carbon atoms, said copolymer having a K-value of from 20 to 50 measured in cyclohexanone, as well as the method of producing the same by continuous addition of the monomer mix to an aqueous emulsion.

6 Claims, No Drawings

COPOLYMERS OF VINYL CHLORIDE AND 2-HYDROXYPROPYL-ALKYL MALEATE

For the varnish industry it is of great importance to have vinyl chloride copolymers available which are capable of being cross-linked and which are compatible with other varnish ingredients. Of particular advantage are copolymers which contain hydroxyl groups, since they can be cross-linked in various ways. Hereto such copolymers were produced mostly in that vinyl chloride-vinyl acetate copolymers were subjected to partial saponification so that free hydroxyl groups were produced in the polymer. Such copolymers have the disadvantage, however, that they are never very heat stable. Stoving at temperatures above 150°C, for example, is not possible under practical conditions without visible thermal dissociation.

Another possibility known from the state of the art of producing vinyl chloride copolymers containing hydroxyl groups consists in polymerizing vinyl chloride with acrylic esters, where the alcohol of the ester carries a free hydroxyl group. These often described copolymers have the disadvantage, however, that they already cross-link to a great extent during the polymerization and are thus unsuitable as varnish ingredients.

Another disadvantage of all presently known vinyl chloride copolymers containing hydroxyl groups is that they are soluble in esters, ketones and chlorinated hydrocarbons, but not in inexpensive aromatic hydrocarbons.

An object of the invention is, therefore, to develop vinyl chloride copolymers containing hydroxyl groups, which are characterized by good thermal stability and good compatibility with other varnish ingredients as well as solubility both in esters, ketones and chlorinated hydrocarbons and also in aromatic hydrocarbons.

Another object of the present invention is the development of copolymers of vinyl chloride and 2-hydroxypropyl-alkyl maleates and/or fumarates consisting of a copolymerizate with from 65% to 95% by weight of vinyl chloride monomer units, from 5% to 35% by weight of hydroxy-containing monomer units selected from the group consisting of 2-hydroxypropyl-alkyl maleates, 2-hydroxypropyl-alkyl fumarates, and mixtures thereof, where alkyl has from 8 to 18 carbon atoms, and from 0 to 15% by weight of maleate monomer units selected from the group consisting of dialkyl maleates, dialkyl fumarates, and mixtures thereof, where alkyl has from 8 to 18 carbon atoms, said copolymerizate having a K-value of from 20 to 50 measured in cyclohexanone.

A further object of the present invention is the development of a process for the preparation of the above copolymers comprising the steps of preparing an aqueous phase containing at least one water-soluble free radical polymerization catalyst and at least one oil-in-water emulsifier, continuously adding thereto a mixture of vinyl chloride and 2-hydroxypropyl-alkyl maleates and/or fumarates in amounts sufficient to give a copolymerizate having from 65% to 95% by weight of vinyl chloride monomer units, from 5% to 35% by weight of hydroxy-containing monomer units selected from the group consisting of 2-hydroxypropyl-alkyl maleates, 2-hydroxypropyl-alkyl fumarates, and mixtures thereof, where alkyl has from 8 to 18 carbon atoms, and from 0 to 15% by weight of maleate monomer units selected from the group consisting of dialkyl maleates, dialkyl fumarates, and mixtures thereof, were alkyl has from 8 to 18 carbon atoms, while stirring at a temperature of between 30°C and 80°C at a rate sufficient that the saturation vapor pressure of the vinyl chloride is not attained, and recovering said copolymer.

These and other objects of the invention will become more apparent as the description thereof proceeds.

The above objects were achieved by the present discovery of vinyl chloride copolymers characterized by a content of 65% to 95% by weight, preferably 70 to 85% by weight, of vinyl chloride and 5% to 35% by weight, preferably 15% to 30% by weight, of 2-hydroxypropyl-alkyl maleate and/or fumarate, where the alkyl contains 8 to 18 carbon atoms and is preferably branched, as well as, if necessary, 0 to 15% by weight of a dialkyl maleate and/or fumarate, where the alkyl contains 8 to 18 carbon atoms, with a K-value of 20 to 50, preferably 25 to 40, measured in cyclohexanone.

Examples of alkyl groups having between 8 to 18 carbon atoms are n-octyl, 2-ethylhexyl, diisobutyl, particularly isononyl, n-decyl, isodecyl, lauryl, isotridecyl and stearyl. These alkyls are both examples for the 2-hydroxypropyl-alkyl maleates or fumarates, as well as for the dialkyl maleates or fumarates.

The dialkyl esters optionally utilized can be obtained readily from the acids or anhydrides and the corresponding alcohols. The 2-hydroxypropyl esters are produced, for example, according to British Pat. No. 1,162,898. The monoesters of maleic acid or fumaric acid with the alkyl having 8 to 18 carbon atoms are reacted with propylene oxide (if necessary in the presence of catalysts) to obtain the corresponding 2-hydroxypropyl-alkyl esters according to the reaction:

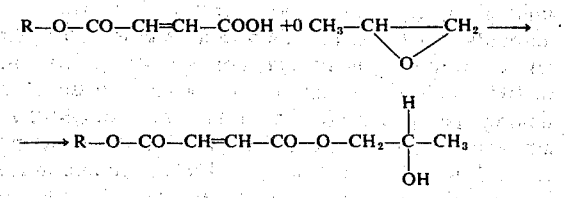

The polymers according to the invention are particularly suitable for the production of coatings and linings.

More particularly, the invention relates to copolymers of vinyl chloride and 2-hydroxypropyl-alkyl maleates and/or fumarates consisting of a copolymerizate with from 65% to 95% by weight of vinyl chloride monomer units, from 5% to 35% by weight of hydroxy-containing monomer units selected from the group consisting of 2-hydroxypropyl-alkyl maleates, 2-hydroxypropyl-alkyl fumarates, and mixtures thereof, where alkyl has from 8 to 18 carbon atoms, and from 0 to 15% by weight of maleate monomer units selected from the group consisting of dialkyl maleates, dialkyl fumarates, and mixtures thereof, where alkyl has from 8 to 18 carbon atoms, said copolymerizate having a K-value of from 20 to 50 measured in cyclohexanone; as well as the process of preparing the copolymers comprising the steps of preparing an aqueous phase containing at least one water-soluble free radical polymerization catalyst and at least one oil-in-water emulsifier, continuously adding thereto a mixture of vinyl chloride and 2-hydroxypropyl-alkyl maleates and/or fumarates in amounts sufficient to give a copolymerizate having from 65% to 95% by weight of vinyl chloride monomer units, from 5% to 35% by weight of hydroxy-containing monomer units selected from the group consisting of 2-hydroxypropyl-alkyl maleates, 2-hydroxypropyl-alkyl fumarates, and mixtures thereof, where alkyl has from 8 to 18 carbon atoms, and from 0 to 15% by weight of maleate monomer units selected from the group consisting of dialkyl maleates, dialkyl fumarates, and mixtures thereof, where alkyl has from 8 to 18 carbon atoms, while stirring at a temperature of between 30°C and 80°C at a rate sufficient that the saturation vapor pressure of the vinyl chloride is not attained, and recovering said copolymer.

It was surprisingly found that the 2-hydroxypropyl-alkyl maleates and fumarates can be polymerized with vinyl chloride without marked cross-linking over the free hydroxyl groups. It is thus possible to produce copolymers with the desired K-value range (with lower K-values). Low K-values are desirable because it permits the production of concentrated varnish solutions from copolymers without having an excessive viscosity increase.

Furthermore, the copolymers according to the invention show very good compatibilities with other varnish ingredients, particularly the compatibility with alkyd resins is excellent.

Of particular advantage is the fact that the new copolymers show a particularly good thermal stability. Due to this property it is possible to subject varnishes prepared from the products of the invention to temperatures over 150°C and thus to achieve rapid stoving without discoloration of the varnish.

The cross-linkability of the resins according to the invention is manifold and very good. For example, they can be cross-linked by polyisocyanates (in amounts of 40% to 60% by weight, based on the resin and cross-linking agent), urea resins and phenol resins (in amounts of 10% to 40% by weight, based on the resin and cross-linking agent), melamine resins (in amounts of 10% to 25% by weight, based on the resin and cross-linking agent), and epoxide compounds (frequently in amounts of 1% to 40% by weight, based on the mixture). Temperatures of 80° to 200°C are generally used in cross-linking. The varnish surfaces obtained are characterized by very good resistance to chemical agents and solvents, for example, water, oils, fats and other solvents.

The solubility of the copolymers in the conventional varnish solvents, such as ketones, esters and chlorinated hydrocarbons, is likewise very good. In addition, the copolymers of the invention are readily soluble in inexpensive aromatic hydrocarbons, such as benzene, toluene, xylene or tetralin. The conventional, but expensive, varnish solvents are, for example, acetone, methylethyl ketone, methyl isobutyl ketone, cyclohexanone, methoxy-hexanone, methylamyl ketone, methyl acetate, ethyl acetate and butyl acetate, as well as methylene chloride and mixtures thereof.

The applicability of the copolymers is very manifold. Of particular interest is the use as a varnish ingredient, also in mixture with other resins and optionally under addition of inorganic pigments, such as chrome yellow, green chromium oxides, molybdenum orange and red, iron oxides, carbon black, titanium oxide and of organic pigments, such as phthalocyanins, and of fillers, such as highly dispersed silicic acids, alumina silicates, bentonites, kaolins, talc, dolomite, heavy spar, blanc fixe and mica. A typical application is the use for the production of coating varnishes for metal surfaces, where good corrosion protection and excellent mechanical deformability are required, such as metal sheeting lacquers, packaging laquers, laquers for containers and pipes. As coatable metals are mentioned by of example: iron, zinc, aluminum, copper, brass, tin and cadmium. However, other surfaces such as wood, glass or plastic surfaces can also be coated.

An advantageous composition for metal coating varnishes consists of:
  15% to 35% by weight of binder which contains 40% to 90% by weight of the copolymer of the invention and 10% to 60% by weight of cross-linking agents, and
  65% to 85% by weight of solvents, as well if necessary,
  10% to 35% by weight of volume of pigments, based on the sum of binders and pigment.

Varnishes can also conatin other lacquer ingredients, for example, alkyd resins or vinyl chloride/vinyl acetate copolymers.

The production of the polymers can be effected according to all known polymerization methods, such as block, solution, suspension and emulsion polymerization, where free radical polymerization catalysts are employed. The copolymers are preferably produced by introducing the vinyl chloride and the maleic acid esters or fumaric acid esters continuously under stirring into an aqueous phase which contains water-soluble free radical polymerization catalysts, emulsifiers and solution aids, and polymerizing the monomer-water emulsion formed continuously at 30°C to 80°C while adding the monomer mixture at a rate that the saturation vapor pressure of the vinyl chloride is not attained.

The commonly employed anionic, cationic and amphoteric emulsifiers can be utilized, mostly in amounts of from 0.2% to 3% by weight, based on the weight of the monomers. Such emulsifiers are, for example, fatty acid soap, alkyl sulfates, alkane sulfonates, alkylbenzene sulfonates, alkylnaphthalene sulfonates, sulfosuccinic acid dialkyl esters, phosphoric acid partial esters, quaternary alkyl ammonium salts, partial fatty acid esters of polyhydric alcohols, such as sorbitol monopalmitate, fatty alcohol sulfuric acid half-esters, partially etherified poly-alcohols, condensation products of alkylene oxides, such as ethylene oxide and/or propylene oxide, with higher fatty acids or higher fatty alcohols or alkylphenols and mixtures thereof. In each instance a hydrophobic chain of at least 8 carbon atoms is present.

The customary water-soluble free radical formers can be used, frequently in amounts of from 0.1% to 1% by weight based on the monomers, for example, the salts of peroxysulfuric acid, such as ammonium persulfate, potassium persulfate, or sodium persulfate, hydrogen peroxide, tert.- butyl hydroperoxide. Reducing agents, generally in amounts of from 0.01% to 0.5% by weight based on the monomers, can also be added. Examples of such reducing agents are the alkali metal thiosulfates, dithionites, sulfites and rongalite, as well as mixtures thereof. If necessary, copper salts and iron salts can be used as promoters.

The monomer mixture can be charged in small or minor amounts in the aqueous phase, the major part is added continuously corresponding to the consumption during the polymerization. The consumption can be determined with reference to the pressure in the autoclave. The continuous addition is so effected that the pressure does not drop at a constant temperature and does not attain the saturation vapor pressure of vinyl chloride either. The pressure is mostly between 5 and 10 atmospheres gauge.

Examples of solution aids are ketones, for example, alkanones having from 3 to 6 carbon atoms, such as acetone and methylethyl ketone, esters, for example, alkyl alkanoates having from 3 to 6 carbon atoms, such as methyl acetate and ethyl acetate, and alcohols, preferably alkanols having from 1 to 3 carbon atoms, such as methanol, ethanol and isopropanol. The solution aid is present in amounts of from 10% to 40% by weight, based on the water-portion of the emulsion.

Other polymerization aids can also be present in the reaction mixture, for example, buffers and/or molecular weight regulators, such as aldehydes, chlorinated hydrocarbons or mercaptans.

The copolymers are obtained from the aqueous emulsion in known manner by precipitation, for example, with metal salts such as sodium chloride or calcium chloride.

The following example is illustrative of the invention without being limitative.

EXAMPLE 400 ml of fully deionized water, 190 ml of methanol, 1.2 gm of potassium persulfate, 6 gm of transethylene dichloride and 4.8 gm of the emulsifier "Aerosol OT" (sodium salt of sulfosuccinic acid dioctyl ester) were charged under stirring in a 1-liter stirring autoclave. Subsequently the air was removed by nitrogen evaporation. After heating to a temperature of 70°C, a mixture of 165 gm of vinyl chloride and 70 gm of 2-hydroxypropyl-isononyl maleate was added continuously in doses so that a pressure of 8 atmospheres was maintained in the autoclave. After six hours, the monomer had been completely added. The polymerization was then continued for a further 2 hours to an end pressure of 2.5 atmospheres. After coagulation with calcium chloride and subsequent washing, a copolymer with a K-value of 30.4 was obtained (measured in cyclohexanone according to Fickentscher, Cellulosechemie, 13, 1932, p. 60). The copolymer was readily soluble in benzene, toluene, xylene and tetralin (15% solutions).

For the determination of the alkyd resin compatibility, 20% solutions, both of the varnish resins and of the alkyd resins in methylethyl ketone, were mixed in ratios of 3:1, 1:1 and 1:3, so that the alkyd resin content of the solutions was 5%, 10% and 15% by weight, respectively. The solutions thus prepared were poured on a glass plate, dried in air during the course of a day, and finally evaluated by microscopic viewing according to the grades:

1 = compatible
2 = compatible with slight disturbances
3 = moderately compatible
4 = incompatible.

The following alkyd resins sold by Bayer of Leverkusen, Germany, were tested:

"Alkydal L 49" - Linseed oil-alkyd resin, 32% phthalic acid, 50% oil content;
"Alkydal L 67" - Linseed oil-alkyd resin, 23% phthalic acid, 67% oil content;
"Alkydal S 65" - Soybean oil-alkyd resin, 26% phthalic acid, 63% oil content.

The compatibility with "Alkydal L 49" was evaluated as 1 in all three cases, as was the compatibility with "Alkydal S 65". With the alkyd resin, "Alkydal L 67", the compatibility at 5% and 10% was evaluated as 1- and at 15% as 1.

The preceding specific embodiment is illustrative of the practice of the invention. It is to be understood, however, that other expedients known to those skilled in the art or disclosed herein may be employed without departing from the spirit of the invention or the scope of the appended claims.

We claim:
1. Copolymers of vinyl chloride and 2-hydroxypropyl-alkyl maleates consisting of a copolymerizate with from 65% to 95% by weight of vinyl chloride monomer units, and from 5% to 35% by weight of 2-hydroxypropyl-isononyl maleate monomer units, said copolymerizate having a K-value of from 25 to 40 measured in cyclohexanone.
2. The copolymers of claim 1 wherein from 70% to 85% by weight of said vinyl chloride monomer units and from 15% to 30% by weight of said 2-hydroxypropyl-isononyl maleate monomer units are present.
3. A process for the production of the copolymers of claim 1 comprising the steps of preparing an aqueous phase containing at least one water-soluble free radical polymerization catalyst and at least one oil-in-water emulsifier, continuously adding thereto a mixture of vinyl chloride and 2-hydroxypropyl-isononyl maleate in amounts sufficient to give a copolymerizate having from 65% to 95% by weight of vinyl chloride monomer units, from 5% to 35% by weight of 2-hydroxypropyl-isononyl maleate monomer units, while stirring at a temperature of between 30°C and 80°C at a rate sufficient that the saturation vapor pressure of the vinyl chloride is not attained, and recovering said copolymer.
4. The process of claim 3 wherein from 70% to 85% by weight of said vinyl chloride monomer units and from 15% to 30% by weight of said 2-hydroxypropyl-isononyl maleate monomer units are present.
5. A binder composition for coating metal surfaces consisting of from 15% to 35% by weight of a binder consisting of 40% to 90% by weight of the binder of the copolymer of claim 1 and 10% to 60% by weight of the binder of cross-linking agents, from 65% to 85% by weight of lacquer solvents.
6. A varnish consisting of the binder composition of claim 5 and from 10% to 35% by volume, based on the volume of the binder and pigment content, of pigments.

* * * * *